Inventor:
Ernst F.W.Alexanderson,
by
His Attorney.

Patented Jan. 3, 1928.

1,655,042

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

SPEED-CONTROL SYSTEM.

Application filed July 14, 1926. Serial No. 122,493.

My invention relates to systems for controlling the speed of electrical machines, and has for its principal object the provision of an improved system wherein the speed of an electrical machine is controlled through variation in the grid potential of electron discharge means such as a vapor electric device or the like.

It is well known that an electrical machine, such as the induction motor, tends to operate at substantially constant speed so long as it is supplied with current at constant frequency and is not subjected to variable load. Various systems have been proposed and used for varying the machine speed independently of the load and frequency at which it is operated. Many of these system comprise means for adjusting the machine speed by change in the relation between the magnetic fields of its inducing and induced windings. In accordance with my invention, this relation is controlled by variation in the conductivity of electrical valve apparatus interposed between one of the machine windings and its source of current supply.

My invention will be better understood from the following description when considered in connection with the accompanying drawings and its scope will be pointed out in the appended claims.

Figure 1:
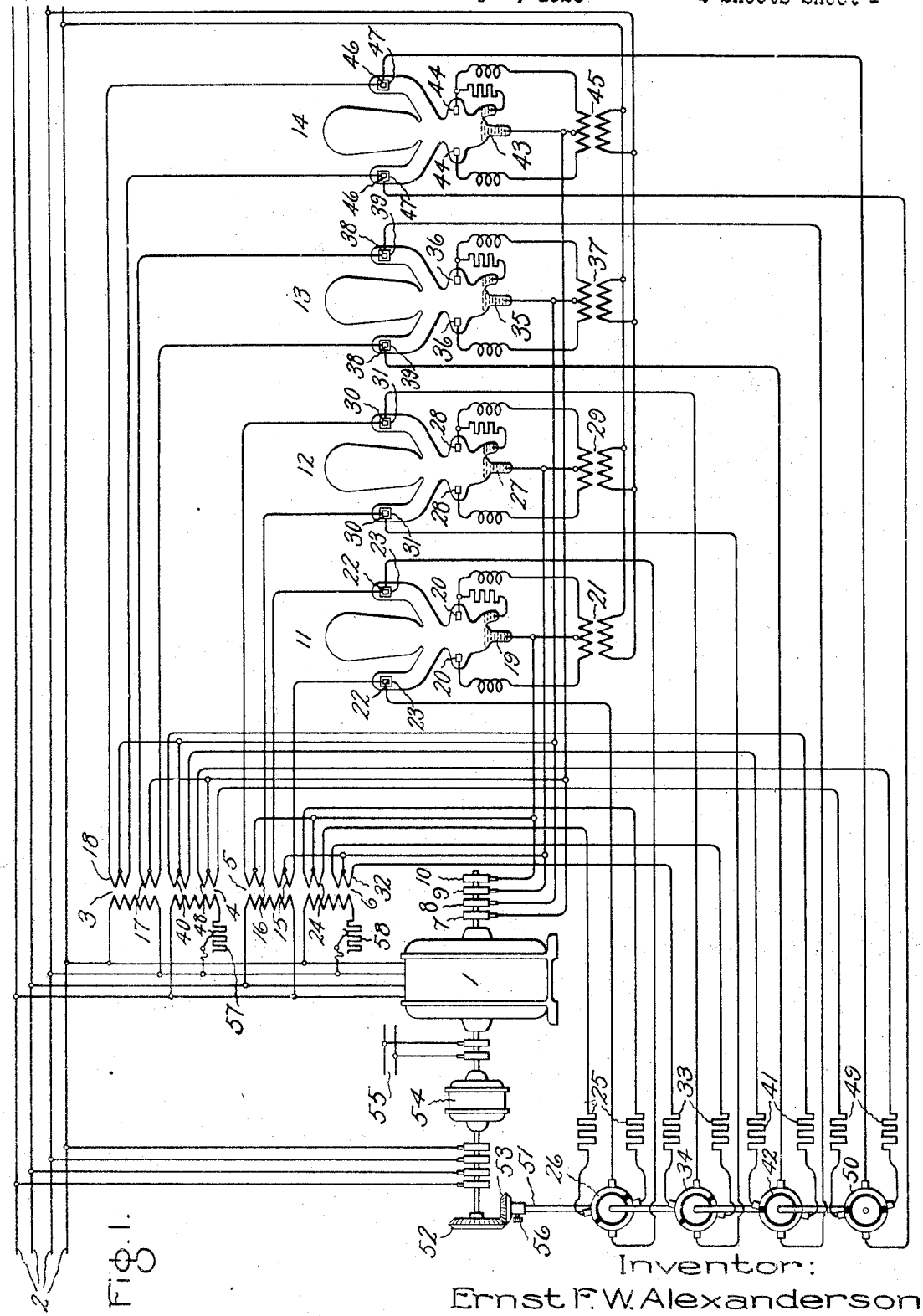
Figure 2:
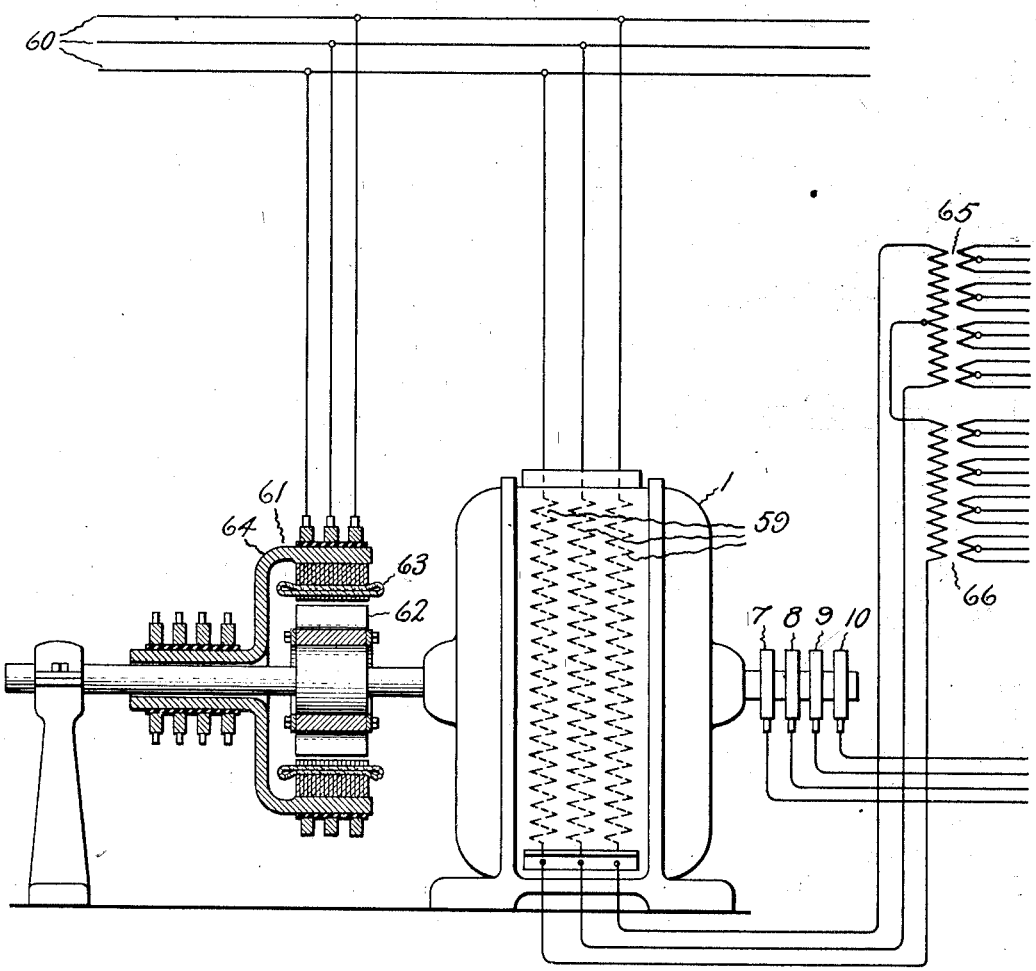

Referring to the drawings, Fig. 1 illustrates a speed control system wherein my invention has been embodied; Fig. 2 illustrates a modified embodiment of the invention, and Fig. 3 relates to certain details in the operation of my invention.

Fig. 1 shows an induction machine 1 which comprises an inducing winding connected to a polyphase alternating current circuit 2. The primary circuits of a plurality of potential transformers 3, 4, 5 and 6 are also connected to this circuit. The motor 1 comprises a polyphase induced winding which is connected to the circuit 2 through slip rings 7 to 10, electron discharge devices 11 to 14, and the secondary windings 15 to 18 of the transformers 3 and 5. It will be apparent that any suitable means other than the potential transformers 3 and 5 may be provided for supplying current to the induced winding through devices 11 to 14 which are shown as electric valves of the vapor electric type.

The valves 11 and 12 are arranged to transmit current successively in opposite directions through one phase of the induced winding and the valves 13 and 14 are arranged to transmit current successively in opposite directions through the other phase of the induced winding.

It will be observed that the valve 11 comprises a cathode 19 which is connected to its exciting electrodes 20 through exciting transformer 21, is connected to its main anodes 22 through slip ring 10, one phase of the induced winding, slip ring 9 and opposite halves of the secondary circuit 15, and is connected to its grid 23 through opposite halves of a secondary circuit 24, resistors 25 and the brushes and insulated segments of a rotatable commutator disk 26. The valve 12 likewise comprises a mercury cathode 27 which is connected to its exciting electrodes 28 through an exciting transformer 29, is connected to its main anodes 30 through slip ring 9, one phase of the induced winding, slip ring 10 and opposite halves of the secondary circuit 16, and is connected to its grids 31 through opposite halves of a secondary circuit 32, resistors 33 and a commutator disk 34. With these connections, current is supplied from the current transformer 6 to one phase of the induced winding at a frequency dependent on the rotational speed of the commutator disks 26 and 34 which control the grid potentials of valves 11 and 12, this current being successively carried by the valves 11 and 12 during alternate half cycles.

In order to protect the valves 11 and 12 against short circuit due to both of them being open at the same time, the brushes of the commutator disks 26 and 34 are unevenly spaced about the periphery of the disks so that the potentials of their respective grids are changed in a manner to produce a slight time interval between the times when one of the valves closes and the other opens.

The current of the other phase of the induced winding is successively carried by valves 13 and 14 during alternate half cycles. The valve 13 comprises a mercury anode 35 which is connected to its exciting electrodes 36 through an exciting transformer 37, is connected to its main anodes 38 through slip ring 8, the other phase of the induced winding slip ring 7 and opposite halves of the secondary circuit 17, and is connected to its grids 39 through opposite halves of a secondary circuit 40, resistors 41 and a commutator disk 42. The mercury cathode 43 of the valve 14 is connected to its exciting electrodes 44 through an exciting transformer 45, is connected to its main anodes 46 through slip ring 7, the other phase of the inducing winding, slip 8, and opposite halves of the secondary circuit 18, and is connected to its grids 47 through opposite halves of the secondary circuit 48, resistors 49 and commutator disk 50. With these connections, current is transmitted from the transformer 3 to one phase of the induced winding and from the transformer 5 to the other phase of the induced winding, the frequency of these polyphase currents being determined by the rotational speed of a shaft 51 upon which the commutator disks 26, 34, 42 and 50 are mounted for the purpose of controlling the grid potentials of the valves 11 to 14.

Short circuiting of the valves 13 and 14 due to both of them being made conductive at the same time is prevented by spacing the brushes of the disks 42 and 50 so that the potentials of grids 39 and 47 are controlled in a manner to maintain one valve closed while the other valve is open and for a short interval of time thereafter. With the illustrated arrangement of the brushes of commutator disks 26, 34, 42 and 50, the valves are open during time intervals which are slightly shorter than the time intervals during which they are closed. Opening and closing of the valves is produced by rotation of the shaft 51.

The shaft 51 is coupled to the shaft of the machine 1 through gears 52 and 53 and a synchronous motor 54 which is provided with a rotatable armature winding connected to the polyphase line 2 and mounted on a shaft rotatable independently of the shaft of machine 1. The motor 54 is also provided with a field winding mounted on the shaft of the machine 1 and connected to direct current supply means shown as busses 55. Means shown as a bolt or screw 56 are provided for permitting adjustment of the gear 53 about the shaft 51 to change or adjust the angular relation between the magnetic fields of the inducing and induced windings. Means shown as resistors 57 and 58 are provided for adjusting the phase relation between the anode and grid voltages of devices 11 to 14.

During operation of the machine 1 below synchronism, energy is generated by the rotor or induced winding and the devices 11 to 14 function to convert this energy to line frequency and to transmit this connected current to the line 2. Operation of the machine from subsynchronous to supersynchronous speeds is effected by adjustment of the phase control devices 57 and 58. Thus when the phase relation between the grid and anode potentials of devices 11 to 14 is so adjusted that the electromotive forces applied through these devices is zero, the induction machine 1 will operate at a speed dependent on the resistance of its rotor winding. When the phase adjustment is such that an electromotive force is applied to the induced winding through devices 11 to 14, however, the machine operates at a speed above synchronism. If the phase relation between the grid and anode potentials is such that energy is supplied from the induced winding to the line 2, the machine operates at subsynchronous speed. The machine will operate at substantially constant speed for each adjustment of the phase control devices 57 and 58.

It will be apparent that the machine 1 may be operated either as a motor or a generator. Thus if the machine is adjusted for substantially constant speed when operated as a motor either above or below synchronism, it will automatically tend to operate as a generator if driven at a higher speed. It will be understood that any suitable phase control means may be utilized to adjust the phase relation between the anode and grid potentials of devices 11 and 14.

Figure 3:
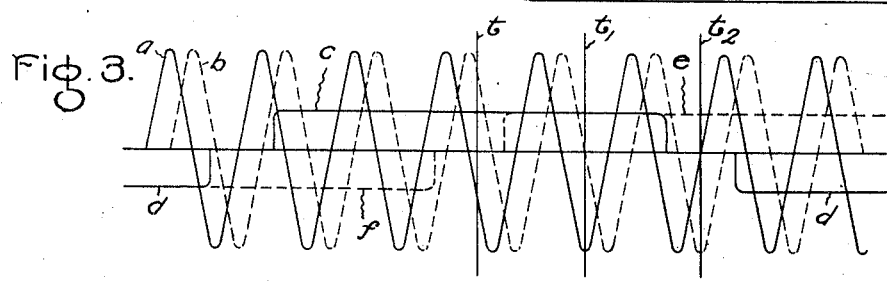

In explaining the operation of the system, reference will be made to Fig. 3 wherein curves $a$ and $b$ represent the polyphase currents supplied to the inducing winding of the machine 1 and the curves $c$, $d$, $e$ and $f$ represent the currents supplied to the induced winding of the machine 1 through valves 11, 12, 13 and 14, respectively.

An understanding of the operation will be facilitated by assuming that the gear 53 has been adjusted about the shaft 51 so that at an instant $t$ the disks 26, 34, 42 and 50 are in their illustrated positions and are rotating in a clockwise direction at a speed proportional to the slip speed of the machine 1. At the instant $t$, each anode 22 has the same polarity as the corresponding grid 23 and current is transmitted through the valve 11 to one phase of the inducing winding, each anode 30 has a different polarity from that of the corresponding grid 31 and no current is transmitted through the valve 12, each anode 38 has a different polarity from its corresponding grid 39 and no current is transmitted through the valve 13, and each anode 46 has a different polarity from its corresponding anode, thereby maintaining the valve 14 closed.

At the instant $t$, the entire current of the inducing winding is carried by the valve 11. At the succeeding instant of time $t_1$, the insulated segments of the commutator disk 42 have rotated into positions such that the anodes 38 are changed to the same polarity as their corresponding grids and current is transmitted to the different phases of the induced winding through valves 11 and 13. At the instant of time $t_2$, the insulated segments of commutator disk 26 have been rotated into a position such that the valve 11 is closed and the current of the inducing winding is carried by the valve 13 for a short interval of time after which the insulated segments of commutator disk 34 move into a position such that the valve 12 is opened and current is transmitted to the different phases of the inducing winding through valves 12 and 13.

From what has been said, it will be apparent that valves 11 to 14, together with their control apparatus, function as a frequency changer through which current of slip frequency is transmitted between the line 2 and the induced winding of the machine 1, and that the speed of this machine is varied by adjustment of the phase control devices 57 and 58.

Fig. 2 shows the machine 1 as provided with a three phase inducing winding 59 which has its terminal connected to a supply circuit 60 and has the primary circuits of a pair of current transformers 65 and 66 connected in its neutral connection in a manner to supply two phase currents to its induced winding through valves 11 to 14 which have been omitted in order to simplify the drawing. A synchronous motor 61 provided with a salient pole field structure 62 mounted on the shaft of the motor 1 and with an armature winding 63 connected to the line 60 through slip rings mounted on a rotatable armature member 64 of the motor 61 is provided for controlling the grid potentials of the valves 11 to 14. In this modification of the invention, the commutator disks are mounted on the rotatable armature member 64 and their brushes are connected to the grids of the various valves as previously set forth. The operation of this modification differs from that of the modification of Fig. 1 in that the machine will operate with a drooping speed characteristic below synchronous speed.

The embodiments of the invention illustrated and described herein have been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States, is,—

1. The combination of an alternating current circuit, an induction machine comprising an inducing winding and an induced winding, electron discharge means provided with a grid and with a cathode and anode connected between said circuit and said induced winding, and phase control means comprising a resistor connected in circuit with said grid for controlling the speed of said machine.

2. The combination of an alternating current circuit, an induction machine comprising inducing and induced windings, transformer means connected to said circuit, electrical valve means provided with a grid and with a cathode and anode connected between said transformer means and said induced winding, and phase control means arranged to adjust the phase relation between the potentials of said grid and anode.

3. The combination of an alternating current circuit, an induction machine comprising inducing and induced windings, transformer means connected to said circuit, electrical valve means comprising a cathode and anode connected between said transformer means and said induced winding, and means for adjusting the angular relation between the fields of said inducing and induced windings.

4. The combination of a polyphase circuit, an induction machine comprising inducing and induced windings connected to said circuit, electric valve means provided with a cathode and anode connected between said circuit and said induced winding and with a grid connected to said circuit in parallel relation with said anode and cathode, and means for changing the polarity of said grid at a frequency dependent on the slip of said machine.

5. The combination of current supply means, a machine comprising windings connected to said supply means and arranged to be moved with respect to one another, vapor electric means provided with anodes and cathodes connected between said supply means and one of said windings and with grids for controlling the transmission of current between said cathodes and anodes, and means comprising a resistor connected to said supply means in circuit with said grids for controlling the frequency at which current is transmitted through said winding.

6. The combination of current supply means, a machine comprising stator and rotor windings connected to said supply means, electron discharge means provided with cathode and anode means connected between said supply means and said rotor winding and with grid means for controlling the transmission of current between said cathode and anode means, phase control means connected in circuit with said grid means for controlling the frequency at which current is transmitted through said rotor winding, and means for adjusting the angular relation between the fields of said induced and inducing windings.

7. The combination of an alternating current circuit, a machine comprising windings connected to said circuit and arranged to rotate with respect to one another, vapor electric means provided with grids and with anodes and cathodes connected between said circuit and one of said windings, means comprising a resistor connected in circuit with said grid for controlling the speed of said machine, and means comprising a synchronous motor provided with relatively movable windings, one of which is driven at the speed of said machine for controlling the polarity of said grids.

In witness whereof, I have hereunto set my hand this 13th day of July, 1926.

ERNST F. W. ALEXANDERSON.